United States Patent [19]
Kantrowitz et al.

[11] 4,011,521
[45] Mar. 8, 1977

[54] HIGH POWERED LASER

[75] Inventors: Arthur R. Kantrowitz, Arlington; Edward T. Gerry, Boston; Donald A. Leonard, Stoneham; Jack Wilson, Reading, all of Mass.

[73] Assignee: Avco Corporation, Cincinnati, Ohio

[22] Filed: Feb. 16, 1967

[21] Appl. No.: 626,357

[52] U.S. Cl. .............................. 331/94.5 G; 330/4.3
[51] Int. Cl.² ...................... H01S 3/09; H01S 3/22
[58] Field of Search ................... 331/94.5; 330/4.3

[56] References Cited
UNITED STATES PATENTS

| | | | |
|---|---|---|---|
| 3,235,816 | 2/1966 | Wanlass | 331/94.5 |
| 3,302,127 | 1/1967 | Lin | 331/94.5 |
| 3,543,179 | 11/1970 | Wilson | 331/94.5 |

OTHER PUBLICATIONS

Flesher, et al., *Submillimeter Gas Laser*, in Proceedings of the IEEE, vol. 54, No. 4, Apr. 1966, pp. 543–546.
Patel, "Selective Excitation Through Vibrational Energy Transfer . . . – $N_2CO_2$," Nov. 23, 1964, pp. 617–619., Ply. Rev. Let., vol. 13, No. 21.
Patel, "CW Laser Action in $N_2O$," Jan. 1 1965, pp. 12–13, Appl. Phys. Lett., vol. 6, No. 1.
Hurle, et al., "Electronic Population Immersions by Fluid Mechanical Techniques," Sept. 1965, pp. 1601–1609, Phys. of Fluids, vol. 8, No. 9.
Konyukhov, et al., ZhRTF Pis. Red. 3, 436, 1966 [JETP Lett., 3,286 (1966)].

Primary Examiner—Maynard R. Wilbur
Assistant Examiner—N. Moskowitz
Attorney, Agent, or Firm—Charles M. Hogan; Melvin E. Frederick

[57] ABSTRACT

In a laser, a gaseous mixture is suitably heated to a first temperature and at a first pressure to provide a large energy content. The gaseous mixture comprises a polyatomic gas such as carbon dioxide having an upper level, ground state, and intermediate level. It also comprises at least one auxiliary gas such as nitrogen, having an energy level substantially resonant with one of the above-mentioned levels and a relaxation time operative to increase the ratio of the relaxation time of the upper level to that of the lower level. A chamber receives the mixture via a supersonic nozzle proportioned to provide a flow time short compared to the relaxation time of the upper level and long compared to the relaxation time of the lower level and the gas is throttled to a relative low second gas temperature and pressure, whereby population inversion exists in the chamber. An optical resonator defines a light path beam through the gaseous medium in the chamber.

10 Claims, 13 Drawing Figures

Fig. 1

ARTHUR R. KANTROWITZ
EDWARD T. GERRY
JACK WILSON
DONALD A. LEONARD
INVENTORS

BY Charles M. Hogan
Melvin E. Frederick
ATTORNEYS

ARTHUR R. KANTROWITZ
EDWARD T. GERRY
JACK WILSON
DONALD A. LEONARD
INVENTORS

BY Charles M. Hogan
Melvin E. Frederick
ATTORNEYS

HIGH POWERED LASER

CROSS REFERENCE TO RELATED APPLICATION

Those elements of the present invention, which, in combination, constitute an amplifier and the novel method of population inversion which the present invention usefully exploits are disclosed and claimed in the copending patent application of Arthur R. Kantrowitz, Edward T. Gerry, Donald A Leonard and Jack Wilson, entitled "Apparatus for and Method of Providing Population Inversion" filed in the U.S. Patent Office contemporaneously with the present patent application, assigned to the same assignee, which patent application is further referred to as Ser. No. 626,356, filed Feb. 16, 1967, now abandoned.

BACKGROUND OF THE INVENTION

Optical masers or lasers, as the art has developed, generally involve the establishment of an artificial distribution of bound electrons at energy levels other than the natural distribution in a host environment through the application of a source of energy known as the "pumping energy." This results in a greater number of molecules or atoms in some high energy level than in a lower energy level to which it is optically connected. This is known as a population inversion. The electrons present in the host environment in the artificial distribution then give up their energy and undergo a transition to the lower energy level. The released energy may be in the form of electromagnetic radiation; which, in the majority of devices seen thus far in the art, has been light, either in the visible or infrared.

In laser devices currently available in the art, there may be employed a gas, such as a helium-neon mixture; or a crystal, such as chromium doped aluminum oxide; or a non-crystalline solid, such as neodymium glass; or a liquid, such as trivalent neodymium in selenium oxychloride, as the environment which responds to the pumping energy, permitting the population inversion of electrons between an excited state and a lower state. The electrons in returning to the lower state give off quanta of light energy or photons in what is known in the art as a radiative transition. When the density of these photons becomes large, the radiative transition probability increases; and, in the presence of a population inversion, electromagnetic modes into which the photons are emitted, in turn, become most readily able to induce further emission therein. This is known in the art as stimulated emission of radiation and results in a narrowing of the emission line. In the currently available laser devices, electrical power is converted to optical power, pumping light or an electrical discharge or electric current; which, in turn, is used to establish the population inversion. All known prior art lasers are of relatively low power. A high power laser has been a long sought need for a large number of potential applications, both military and commercial, and numerous, attempts have been made to provide a truly high power laser. The gas laser is the general category into which most of these efforts have fitted.

In the Polanyi references identified hereinafter, it is suggested that total and partial inversions may be obtained as a direct result of chemical reaction. Without flow, such inversions are transient. Even if the gas is pulsed thermally and permitted to relax differentially, such disclosed devices are inherently low density devices since the translational and rotational energy is removed by diffusion to the walls. The Hurle et al paper also identified hereinafter suggests supersonic expansion as a method of producing population inversion between electronic states by differential radiation relaxation. While presumably in theory (Hurle et al admit that they were unable to observe an inversion) an inverted population can be produced in this fashion, the size of a device based solely on this principle is limited because of radiative trapping and also the stagnation temperatures required to have a significant fraction of the energy in the desired electronic level at equilibrium are quite high.

The following references and materials cited therein describe some of the background and physical principles involved in the devices under discussion and an insight, to some degree, of application of those principles in the present state of the art:

1. "Infrared and Optical Masers," by A. L. Shawlow and C. H. Townes in Physical Review, Vol. 112, Np. 6, Dec. 15, 1958, pp 1940–1949.
2. "Attainment of Negative Temperatures by Heating and Cooling of a System" by N. G. Basov and A. N. Oraevskii, Soviet Physics JETP, Vol. 17, No. 5, Nov. 1963, pp 1171–1172.
3. "Population Inversion in Adiabatic Expansion of a Gas Mixture" by V. K. Konyukhov and A. M. Prokhorov, JETP Letters, Vol. 3, No. 11, 1 June 1966, pp 286–288.
4. "Electronic Population Inversions by Fluid-Mechanical Techniques" by I. R. Hurle and A. Hertzberg, The Physics of Fluids, Vol. 8, No. 9, Sept. 1965, pp 1601–1607.
5. Polanyi, J. C., J. Chem. Phys. 34, 347 (1961).
6. Polanyi, J. C., Applied Optics Supplement No. 2 on Chemical Lasers, 109 (1965).

SUMMARY OF THE INVENTION AND ITS OBJECTS

In accordance with the invention there is provided a novel high power laser comprising the combination of a gas containing chamber having an exhaust outlet, means for heating a polyatomic gas to provide equilibrium vibrational excitation in said gas, said polyatomic gas having an upper laser level, lower laser level and a ground state, said upper laser level having an effective relaxation time that is long compared to the effective relaxation time of the lower laser level, nozzle means for expanding said heated gas into said chamber into a stream to provide a flow time in said nozzle means that is short compared to the effective relaxation time of said upper laser level and long compared to the effective relaxation time of said lower laser level, and an optical resonator coupled to said stream of gas. The invention further provides a novel lasing method utilizing the principles indicated in the summary of the novel laser.

In the present invention the lasing action utilizes the principle of cooling the gas by expansion to supersonic speeds, this expansion being inherently a volume process which can be performed in any size vessel and at any density consistent with the relevant vibrational relaxation times of the gas. Further, the present invention utilizes transistions between vibrational levels in the ground electronic state which are significant populated at reasonable stagnation temperatures attainable, for example, by combustion. Furthermore, the differential relaxation leading to the inversion is collision dominated and is inherently a volume process which imposes no fundamental limitation on the size or capacity of the laser.

The present invention utilizes a novel method whereby that population inversion is provided by expansion of a hot polyatomic gas or preferably an equilibrium mixture of a polyatomic gas and at least one other gas, through a supersonic nozzle. Polyatomic gases have several modes of vibration; the times required for equilibrium with translation and rotation of the vibrational energy of different modes can be quite different. It is this difference in vibrational relaxation times of separate modes which allows the production of a complete population inversion between vibrational levels of different modes in accordance with the present invention. Thus, the present invention provides supersonic nozzle means and contemplates the rapid expansion of a polyatomic gas through such supersonic nozzle means under conditions of density and temperature set forth in greater detail hereinafter such that the effective relaxation time of the upper laser level is long compared to the flow time through the nozzle while the effective relaxation time of the lower laser level is short compared to the flow time through the nozzle.

As the polyatomic gas passes from subsonic to supersonic in the nozzle, the temperature and density drop rapidly with the increasing velocity. If such and equilibrium gas is provided in the subsonic region at a temperature sufficient that considerable vibrational excitation is present and it is expanded to a low temperature in a time less than the vibrational relaxation time for the upper laser level of the gas, then the upper laser level vibrational energy cannot follow this rapid temperature change and remains at a high value. In the expanded region downstream of the nozzle where the pressure and temperature are low compared to their initial values upstream of the nozzle, the upper laser level relaxation time is greatly increased and the upper laser level vibrational energy can be maintained constant for a distance considerably larger than the nozzle size. Furthermore, in the expanded region, the pressure and temperature are such that the lower laser level relaxation time is substantially less than the upper laser level relaxation time such that the lower laser level vibrational energy remains close to equilibrium with translation and rotation. Thus, in the expanded region downstream of the nozzle, the vibrational energy of the upper laser level is characterized by a temperature close to the initial or stagnation temperature of the gas while the vibrational energy of the lower laser level is characterized by a temperature close to the downstream gas temperature. Provision of substantially different temperatures in accordance with the method used in the present invention produces a population inversion.

It is an object of the present invention to provide laser apparatus utilizing a novel method of producing a population inversion.

It is another object of the invention to provide the combination of means for heating gas and a means for producing population inversion by expansion of the gas to supersonic speeds. This population inversion utilizes transitions between vibrational levels in the ground electronic state rather than between electronic states.

A still further object of the invention is the provision of a gas dynamic laser which is at continuous power levels not heretofore possible.

A still further object of the invention is to provide laser apparatus for producing a degree of population inversion greater than that obtainable by prior art devices utilizing a flowing gas to create a population inversion.

DESCRIPTION OF DRAWINGS

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 8 is a plot of load lines at several stagnation temperatures showing the power production density as a function of total cavity losses (gain = loss for an oscillating system), intra-cavity flux being the ratio of power density to the gain at any point on the curves, the gas mixture being the same as that for FIG. 4;

DESCRIPTION OF THE PREFERRED EMBODIMENT

Figure 1:
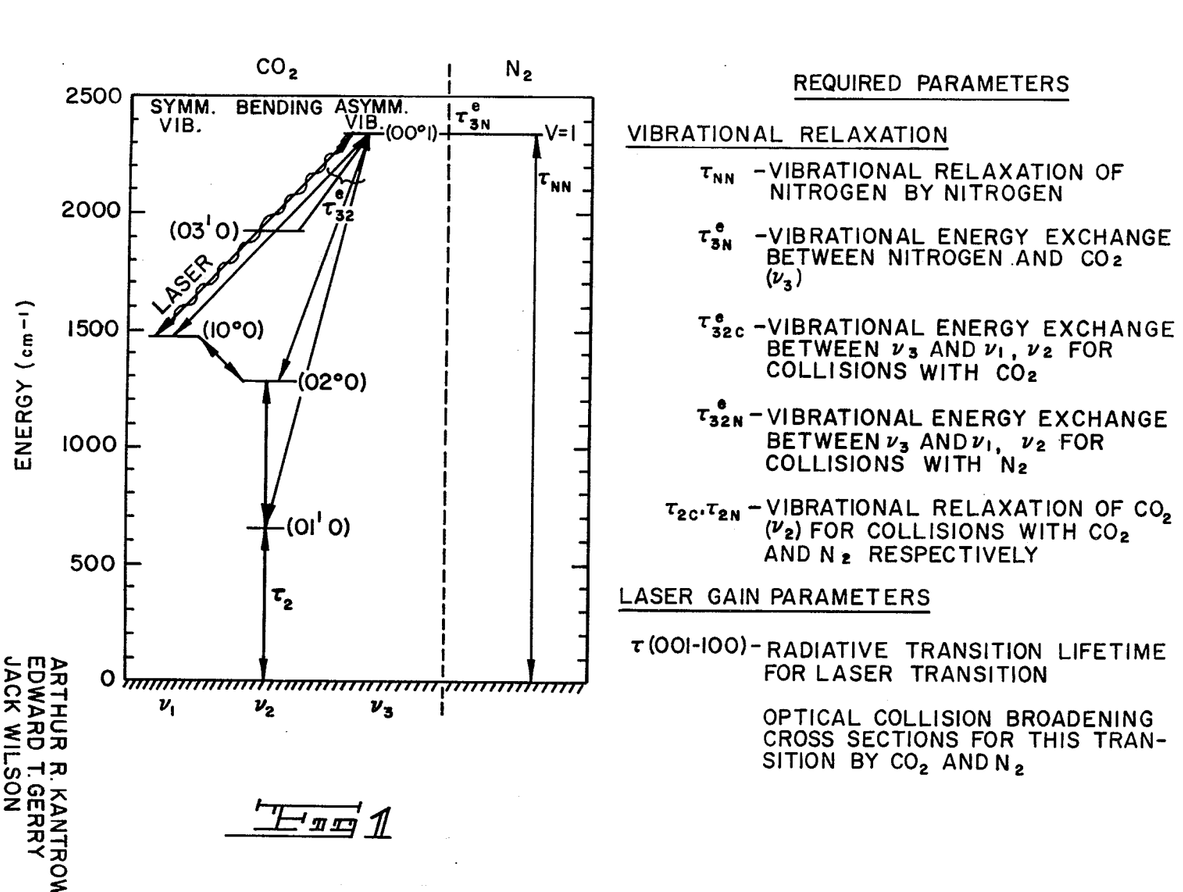
FIG. 1 is a partial vibrational energy level diagram for $CO_2$ and $N_2$ (or CO) showing relevant vibrational deactivation and transfer processes.
Figure 2:
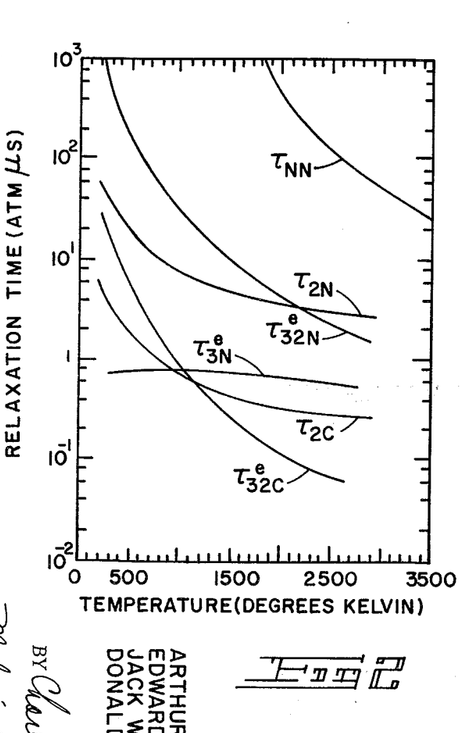
FIG. 2 is a plot showing deactivation and transfer times for $N_2 - CO_2$ system at one atmosphere pressure as a function of kinetic temperature.
Figure 3:
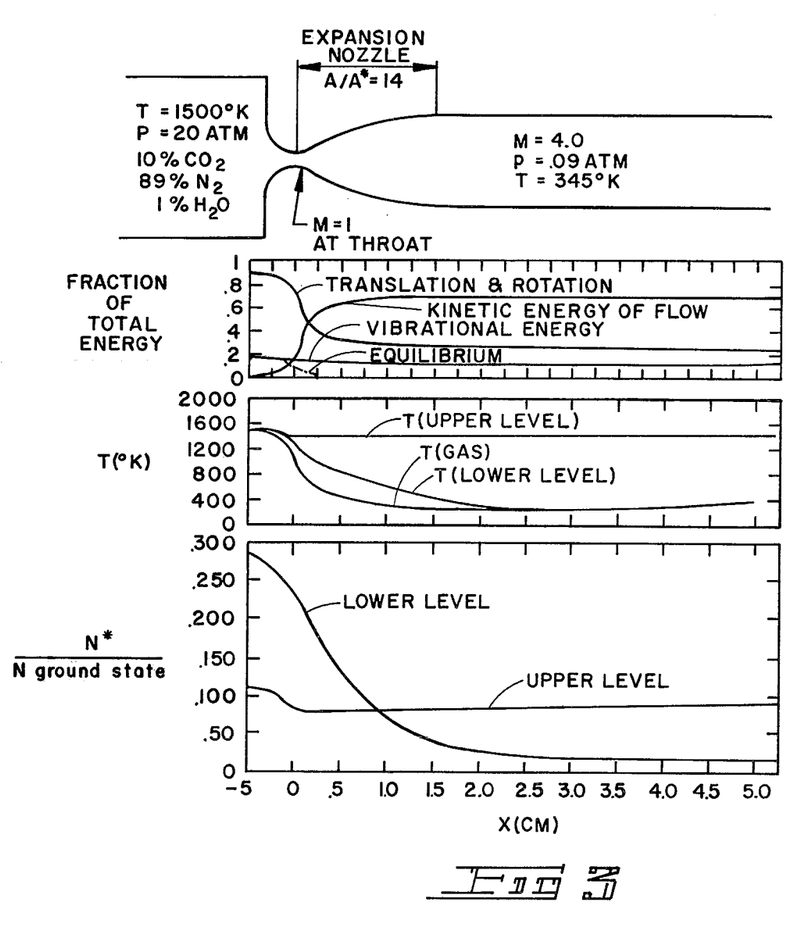
FIGS 3a–d are plots of $N_2 - CO_2$ gas parameters as a function of position in a supersonic nozzle diagrammatically shown in FIG. 3a with differential vibrational freezing.

The performance and operation of a preferred embodiment of the present invention, based on differential freezing of vibrational energy, may be more clearly understood from a consideration of FIGS. 1–3 and the discussions of these figures. The required parameters together with a partial energy level diagram for the vibrational energy levels of nitrogen ($N_2$) and carbon dioxide ($CO_2$) given by way of example are shown in FIG. 1. In this system, the $CO_2$ is the active laser molecule. Both $N_2$ and carbon monoxide (CO) which resonate closely with the upper laser level of the $CO_2$ serve to lengthen the effective vibrational deactivation or relaxation time for the upper laser level and also act as a storage reservoir for laser energy. In the development of the invention, it was found experimentally that $H_2$ and $H_2O$ which are also common combustion products serve to decrease the effective relaxation time of the lower laser level and that at least in concentrations of preferably about 1% have little or no effect on the relaxation time of the upper laser level. Concentrations of up to about 10% may be useful but only for specific operating conditions. By way of example and referring to FIG. 1, $CO_2$, a linear triatomic molecule, has three independent modes of vibration, a symmetric stretching mode designated $\nu_1$ in FIG. 1, a bending mode designated $\nu_2$, and an asymmetric stretching mode designated $\nu_3$. A given vibrational energy level of $CO_2$ is denoted by $(\nu_1\nu_2\nu_3)$ where the integers $\nu_1$, $\nu_2$, $\nu_3$ specify the number of quanta excited in each mode. CW laser action has been previously observed (see Patel, C. K. N., App. Phy. Letters 7, 15 (1965) and Phys. Rev. Letters 13, 617 (1964) in static mixtures of $N_2$ and $CO_2$ on the transition (001) → (100) and pulsed laser action has also been observed on both the transitions (001) → (100) and (001) → (020). It may be expected that devices in accordance with the present invention will operate on the (001) → (100) transition although population inversion will exist for both.

Vibrational freezing in a given nozzle and for a given stagnation temperature can be calculated if the vibrational relaxation times, listed to the right of the energy level diagram in FIG. 1, are known. Deactivation of nitrogen vibration by collision with nitrogen is important in that it must be a slower process than resonant transfer of vibrational excitation to the active laser molecule (in this case $CO_2$ $\nu_3$)) for efficient laser operation. This condition sets a lower limit on the concentration of $CO_2$ or its equivalent. The energy stored in nitrogen vibration is useless to the laser system if the direct collisional deactivation of nitrogen is a more rapid process than the resonant transfer to $CO_2$ ($\nu_3$).

Within $CO_2$ itself the important processes are collisional deactivation of $CO_2$ ($\nu_3$) containing the upper laser level, and $CO_2$ ($\nu_1$) containing the lower laser level. Deactivation of the upper laser level indicated by $\tau^e_{32C}$ for collisions with $CO_2$ and $\tau^e_{32N}$ for collisions with $N_2$, most likely occurs by exchange of energy with others modes (see Herzfeld, K. F., Discussions of the Faraday Society 33, 22–27 (1862)), rather than by direct deactivation. Due to the close energy coincidence between $\nu_1$ levels and alternate $\nu_2$ levels, rapid energy exchange occurs between these modes forcing the relative populations to equilibrate with each other. Thus, the rate limiting process for energy loss from these two modes will be collisional deactivation of $CO_2$ ($\nu_2$), being the one of lower energy. Deactivation times for this process are indicated in FIG. 1 by $\tau_2C$ and $\tau_{2N}$ for collisions with $CO_2$ and $N_2$ respectively.

If other species, such as $H_2O$ or $H_2$, are present then their effect or deactivation of the modes in question must be considered. It should be noted that while loss of vibrational energy from a given mode generally requires a very large number of kinetic collisions, redistribution of energy within a mode occurs with relatively few collisions. Thus, the populations of the various energy levels within a mode tend to an equilibrium Boltzmann distribution in a time short compared to the time for loss of vibrational energy from the mode. The degree of excitation of a given mode can therefore be characterized by a vibrational temperature, $T_V$, which can in general be different from the temperature characterizing translational and rotational energy and indeed different from the vibrational temperatures characterizing the populations of other vibrational modes.

Knowledge of all of the important vibrational deactivation and exchange rates allows calculation of the populations throughout an expansion through a nozzle. In order to relate the vibrational populations of $CO_2$ to gain or absorption in a given transition, two additional parameters are required. These are the radiative lifetime for the proposed laser transition and collisional broadening cross sections for collisions of the radiating $CO_2$ state with $CO_2$ and other molecules present in the system. The latter are necessary as at the pressures considered for operation, the line width will be determined by collisions and not by Doppler broadening. The best estimates of all of these parameters will now be outlined.

Several of the vibrational relaxation processes important to the system in question have been investigated experimentally in the development of the invention. One of the important processes, vibrational energy transfer between $N_2$ and $CO_2$ ($\nu_3$) has also been studied and its cross section measured. The parameters used in the computation of vibrational freezing in supersonic nozzles in connection with the above-mentioned studies will now be summarized.

The vibrational relaxation times that are required for $N_2$ - $CO_2$ laser differential freezing calculations are shown as a function of temperature in FIG. 2. The relaxation times are plotted in units of atm $\mu$s. The actual relaxation time is the quantity shown in FIG. 2 divided by the partial pressure of the collision partner in atmospheres.

The vibrational relaxation time for nitrogen-nitrogen collisions is the longest of all the relaxation times (see Millikan, R. C. and White, D. R., J. Chem. Phy. 39, 98 (1961)). The collisional deactivation of the lower laser state is controlled by the deactivation of the bending mode $\nu_2$. This is a quantity which has been measured many times and is accurately known, both for $CO_2$ - $CO_2$ collisions and for $CO_2$ - $N_2$ collisions.

Several conflicting measurements are available for the collisional deactivation of the upper laser level; for its relaxation time the Schwartz, Slawsky, Herzfeld (SSH) theory is used (see the Herzfeld reference cited above). The SSH theory has been found to be in fair agreement with experimental data which are available for the relaxation of the other modes. Since the SSH theory predicted a shorter relaxation time than was actually measured for these other cases, it is felt that it is a conservative estimate to use the SSH theory for the relaxation of the $\nu_3$ mode.

The laser gain parameters, the transition probability for the (001) → (100) transition, and optical broadening cross sections for this same transition were also measured in the development of the invention. The results are summarized in Table I set forth below.

TABLE I

1. Reciprocal Transition Probability —$\tau_{21}$ = 4.7 Seconds, ± 10%
2. Optical Broadening Collision Frequency —$\nu_c$ = 7.8 × $10^9$ Sec$^{-1}$, ± 10%

AT 273° K, 1 ATM Pressure
Converted to cross section
Optical Broadening $\sigma_o = 5.7 \times 10^{-15}$ CM$^2$
Kinetic Cross Sections
  From Viscosity $\sigma_k = 5.1 \times 10^{-15}$ CM$^2$
  From Van Der Waals $\sigma_k = 6.4 \times 10^{-15}$ CM$^2$
3. Collision Broadening Cross Sections - Other Gases $(\sigma N_2/\sigma CO_2) = 0.88$ $(\sigma CO/\sigma CO_2) = 0.98$ $(\sigma He/\sigma CO_2) = 0.31$ With the parameters listed in Table I, measurements of laser gain can be related directly to inversion densities and conversely calculations of inversion densities can be related directly to the gain expected.

The relaxation times shown in FIG. 2 have also been used in detailed calculations of vibrational freezing in supersonic nozzles. The results of one of these calculations for a specific case are shown in FIGS. 3a-d. As indicated in FIG. 3a, a hot mixture of nitrogen and $CO_2$ was expanded through a supersonic nozzle to Mach 4. A hot equilibrium gas can be produced in several ways, including transfer heating from a heat source such as a nuclear reactor, shock heating in a shock tube, or by direct combustion, producing a mixture somewhat different from that shown but having essentially the same properties.

In FIG. 3b, the distribution of energy in various parts of the flow field is shown. Energy in thermal translation and rotation in the stagnation region is converted largely into directed kinetic energy of flow in the supersonic region. Energy in vibrational degrees of freedom, which comprises approximately 15% of the total energy in the equilibrium stagnation region, would, if it remained in equilibrium with translation and rotation, virtually disappear in the downstream supersonic region as indicated by the dashed curve in FIG. 3b. However, because of vibrational freezing the fraction of energy in vibration remains high downstream comprising about 10% of the total. It is a portion of this nonequilibrium vibrational energy which can be made available as laser energy. The dimension of the sonic throat is an important parameter in determining the maximum stagnation pressure at which vibrational freezing of the upper laser level and nitrogen can be obtained, since the rate of decrease of temperature and pressure is inversely proportional to it. For the conditions shown in FIG. 3a, the throat was rectangular in shape, one millimeter in minor dimension and of arbitrary major dimension. Essentially the same downstream fractional energy in vibration would be obtained with, for example, a 1 centimeter throat and 2 atmospheres stagnation pressure at the same stagnation temperature and nozzle area ratio.

FIG. 3c shows how vibrational energy is divided among the various vibrational degrees of freedom. The temperature in degrees Kelvin characterizing the populations of the various vibrational modes are plotted as a function of position in the nozzle. As can be seen in FIG. 3c, the temperatures characterizing the $CO_2(\nu_3)$ and nitrogen vibrational populations are essentially equal because of the strong vibrational coupling and fall very little through the nozzle, remaining about 1400° downstream of the nozzle. At the low temperature and pressure downstream (as compared to that upstream of the nozzle), the characteristic relaxation length for these modes combined is of the order of meters and thus almost no further decay of these modes is observable in the length scale of the graph. The translational and rotational temperature falls quickly to a low value in the nozzle. The vibrational temperature characterizing the populations of the $\nu_1$ and $\nu_2$ modes of $CO_2$ falls quickly in the nozzle to a low value somewhat above the gas temperature, but is visible relaxing toward the gas temperature on the length scale of the graph.

In the ratio of $T_V(\nu_3)$ to $T_V(\nu_1)$ exceeds the ratio of the characteristic vibrational energies of the two modes then total population inversion is possible. The fractional populations of the upper and lower laser levels are plotted in FIG. 3d. Note that as shown in FIG. 3d, in the stagnation region the population of the lower (100) level exceeds the population of the (001) level characteristic of an equilibrium situation. However, downstream as the vibrational temperatures become sufficiently separated the population of $CO_2$ (100) drops below that of $CO_2$ (001) and population inversion has been produced. Making use of the laser gain parameters summarized in Table I, this population inversion can be interpreted in terms of laser gain. Knowledge of the gain, together with additional computations performed using the vibrational relaxation rates shown in FIG. 2, allows theoretical evaluation of the performance of systems in accordance with the invention.

The laser characteristics for a device operating under the gas conditions shown in FIG. 3 are listed in Table II.

TABLE II

| Gas Dynamic Laser Parameters | |
|---|---|
| $P_o$ = 20 ATM, $T_o$ = 1600° K, 5% $CO_2$, 95% $N_2$/CO | |
| Zero Power Gain Coefficient | $G = 2 \times 10^{-3} - 5.0 \times 10^{-3}$ CM$^{-1}$ |
| Total Gas Power Flux in Flow | $F_G$ = 24 KW/CM$^2$ |
| Laser Power Flux In Flow | $F_L$ = 0.5 KW/CM$^2$ |
| Laser Thermal Efficiency | $\epsilon = F_L/F_G = 2.1\%$ |
| Saturated Laser Power Density | $P_L$ = 20 - 70 W/CM |
| Interaction Length | $L = F_L/P_L$ = 25 - 7 CM |
| Estimated Laser Cavity Flux | $\approx P_L/\alpha \approx$ 20 KW/CM$^2$ |
| Specific Fuel & Oxidizer Consumption | $\approx$ 60 LB/MEGAJOULE |
| Specific Fuel ($C_2N_2$) Consumption | $\approx$ 10 LB/MEGAJOULE |

For several of the parameters in Table II a range of values is shown. This takes into account the fact that the experimental performance of the gas dynamic laser is actually more ideal than indicated by the detailed calculations. In the case where two numbers are present, the first represents the results of the detailed calculations and the second is computed based on the apparent experimental fact that the upper state freezes at a temperature between the stagnation and throat temperatures and the lower state remains in complete equilibrium with the gas temperature.

The zero power gain coefficient G is believed self-explanatory, the first value being that computed from the populations shown in FIG. 3d and the second, that computed using the ideal assumptions which agree more closely with experiments.

The total gas power flux in flow is simply the total energy stored per unit volume in the downstream supersonic region of the nozzle multiplied by the flow velocity. The total energy includes that in vibration, rotation, random translation, and directed flow. The laser power flux is the flux of available laser energy crossing unit area perpendicular to the flow direction. The available laser energy density is the vibrational energy stored per unit volume in nitrogen, CO if any CO is present, and $CO_2(\nu_3)$ less the energy remaining in these modes when the vibrational temperature characterizing these modes is reduced to a point where the laser gain is just zero, all multiplied by the ratio of the laser photon energy and the $CO_2(\nu_3)$ characteristic energy. This energy density, measured in units of joules/cm$^3$ multiplied by the flow velocity in cm/sec yields the laser power flux in watts per square centimeter of downstream flow area.

The thermal efficiency is simply the ratio of these two fluxes and represents the efficiency of the laser system for converting thermal energy in the stagnation region into laser energy in the working section.

The saturated laser power density is the laser power density corresponding to a transition rate between $CO_2(001)$ and $CO_2(100)$ which lowers the $CO_2(\nu_3)$ vibrational temperature and raises the $CO_2(\nu_1)$ temperature to a point where the gain is just zero. This is the maximum rate at which available laser energy can be removed from the gas. The ratio of the laser power flux, $F_L$, to the saturated laser power density, $P_L$, is thus the minimum length in the flow direction in which all of the available laser energy can be removed by laser action. The first number in each case is obtained from the detailed calculation and is determined largely by the rate at which energy can be removed from the lower state. The second number assumes that only the transfer rate from $N_2$ to $CO_2(\nu_3)$ limits the power density.

Te estimated laser cavity flux gives an indication of the intra-cavity circulating intensity necessary to remove the laser power at the maximum rate. This flux is not a fixed number and depends on the details of cavity absorption and coupling losses. The number presented here corresponds approximately to operating at a point where the total cavity losses are one half the total gain, providing reasonably efficient operation. It gives an indication of the mirror heating problems to be faced with this device.

The gas dynamic laser parameters set forth above give an indication of the mass flow rates required for a particular power level. The first of these is simply the total weight of $N_2$/CO and $CO_2$ which must pass through the device to yield an energy output of one megajoule. Thus, a one megawatt laser under the conditions of the example would have a total mass throughout of approximately 33 lbs./sec. If cyanogen ($C_2N_2$) is burned with air, compressed directly from the atmosphere, to produce the desired mixture, the specific fuel consumption is the weight of cyanogen burned to produce one megajoule of output energy.

Further calculations have been made based on ideal assumptions because additional information on basic cross sections is needed before detailed calculations can be carried further. Shock tunnel experiments, have, however, shown that the ideal values can be generated experimentally. Accordingly, several parametric variations were carried out under the following assumptions. The gas was assumed in complete equilibrium up to the throat of the nozzle. Beyond this point, $N_2$/CO and $CO_2$ ($\nu_3$) vibrational degrees of freedom were assumed frozen at the throat temperature. All other vibrational degrees of freedom were assumed to be in equilibrium at the gas temperature. The gas mixture used in the calculation presented herein corresponds to a possible equilibrium set of combustion products of cyanogen ($C_2N_2$) and air with a small amount of hydrogen added. The stagnation conditions assumed for FIGS. 4, 5 and 6 are a mixture of 89% $N_2$/CO, 10% $CO_2$, and 1% $H_2O$ at a stagnation temperature of 1600° K.

Figure 4:
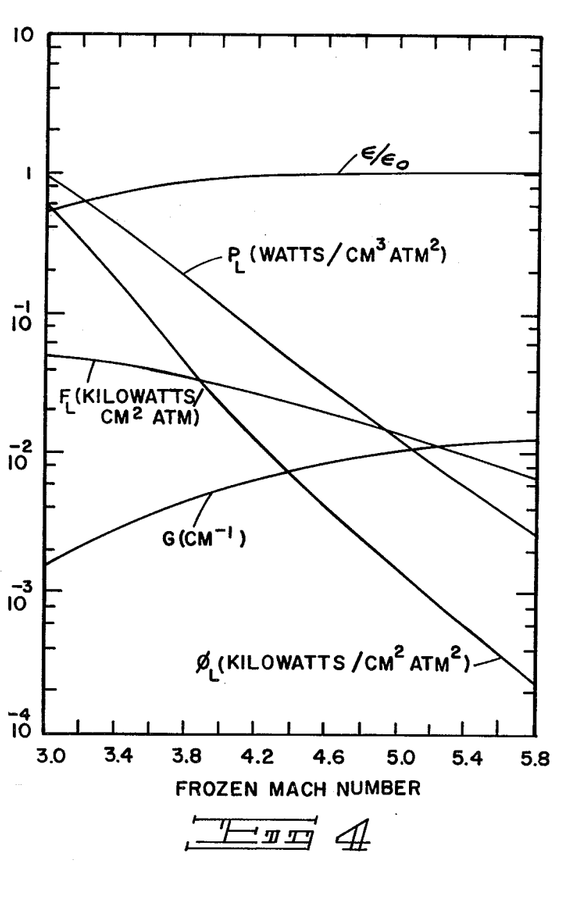
FIG. 4 is a plot of specific parameters as a function of nozzle Mach number for an equilibrium gas consisting of 89% $N_2$/CO, 10% $CO_2$, 1% $H_2O$, at a stagnation temperature of 1600° K.

FIG. 4 shows the variation of specific laser properties as a function of frozen Mach number, the Mach number based on a sound speed calculated using the effective $\gamma$, $(C_p/C_v)$ based on only the equilibrium degrees of freedom.

The stagnation pressure is included in the units of the plotted quantities. $\epsilon/\epsilon_o$ is the ratio of the actual thermal efficiency at the indicated shock number to that if the lower state were completely removed from the system (M =∞). For these gas conditions $\epsilon_o$ is approximately 3.6%. $P_L$ is the laser power density limited only by transfer from nitrogen to $CO_2(\nu_3)$ and is plotted in units of watts/cm$^3$atm$^2$. Thus, the power density increases with the square of the stagnation pressure since the energy transfer rate involves the product of excited $N_2$/CO and $CO_2$ densities. $F_L$, the laser power flux, is proportional only to the first power of pressure since it involves only the stored energy density. The gain, of course, is independent of stagnation pressure since operation is well into the collision broadened limit. The most interesting curve is that showing the saturation cavity flux, $\phi_L$, which varies over a factor of $10^3$ in the Mach number range shown and is also proportional to the square of the stagnation pressure. Since this flux determines the heat transfer rate to windows and mirrors, which has been found to be an important problem, the selection of the operating Mach number is strongly influenced by the radiative heat transfer consideration.

Figure 5:
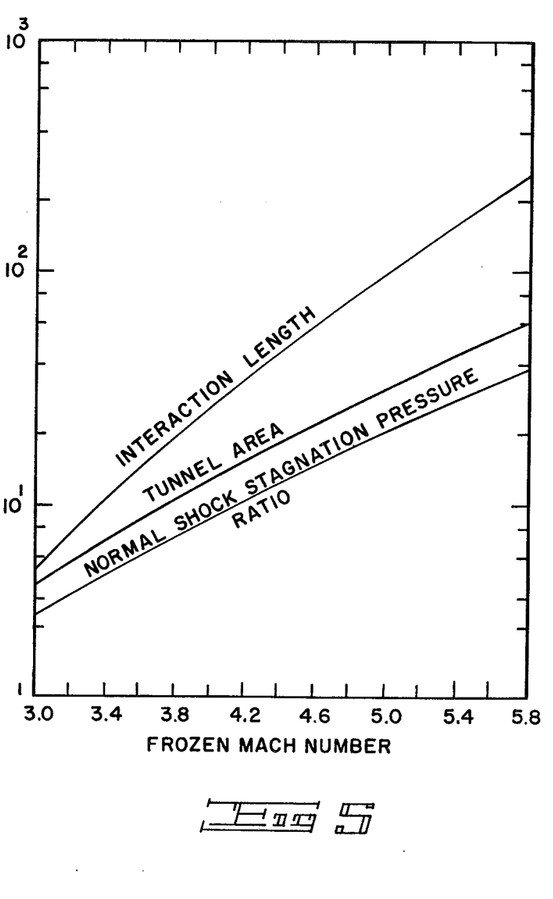
FIG. 5 is a plot of geometric quantities as a function of nozzle Mach number wherein the gas conditions are the same as those for FIG. 4.
Figure 6:
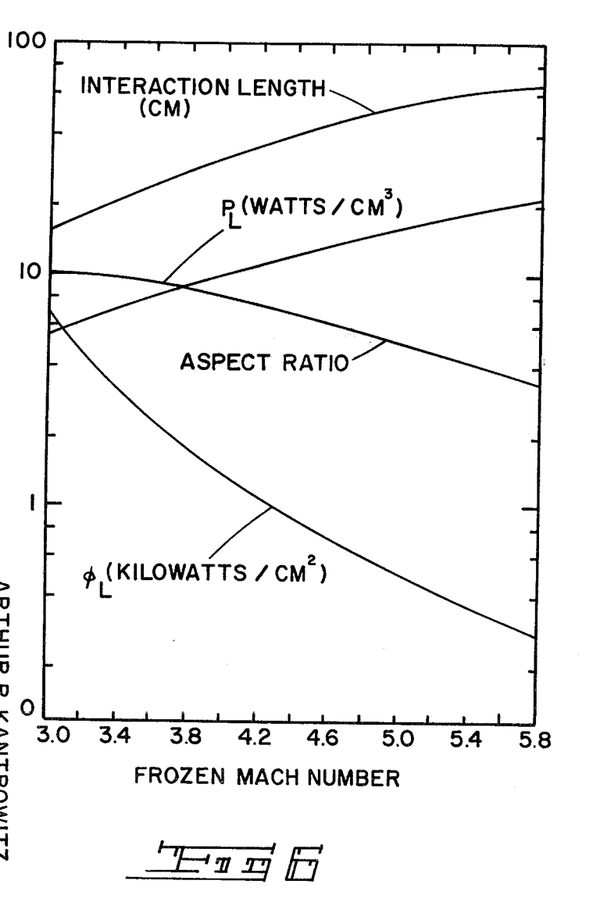
FIG. 6 is a plot of parameters as a function of Mach number for operation at the minimum stagnation pressure consistent with diffuser recovery to atmospheric pressure, throat height being such that the product of the throat height and stagnation pressure is 20 mm atm.

Other factors which influence desgin are shown in FIG. 5. Inspection of FIG. 5 will show that the interaction length is inversely proportional to the stagnation pressure. The tunnel area ratio is the ratio of the laser channel height to the throat height. The final curve, showing the normal shock stagnation pressure ratio, is important in determining the minimum operating stagnation pressure for systems exhausting into a specified back pressure. The stagnation pressure loss in a diffuser is proportional to the normal shock stagnation pressure loss at the operating Mach number. For fixed throat diffusers the loss is essentially equal to the normal shock loss, but where variable throat diffusers are used, this loss can be reduced to about half the normal shock loss. Thus, if the normal shock stagnation pressure ratio is 10, then a minimum stagnation pressure of 10 atmospheres will be required to run a nozzle and recover through a fixed throat diffuser to one atmosphere. A stagnation pressure of approximately twice this value can be expected to be required to start the nozzle. Thus, for a burner with a given maximum operating pressure, the above considerations set the maximum Mach number for which recovery to one atmosphere can be accomplished.

FIG. 6 combines several of the considerations just discussed. In FIG. 6 the stagnation pressure is assumed equal to the normal shock stagnation pressure ratio times one atmosphere. Also, in calculating the aspect ratio, which is the ratio of the interaction length to the channel height, the product of the throat height times the stagnation pressure has been taken equal to 1 mm × 20 atm, parameters which are known to yield the desired differential freezing in the shock tunnel experiments.

Figure 7:
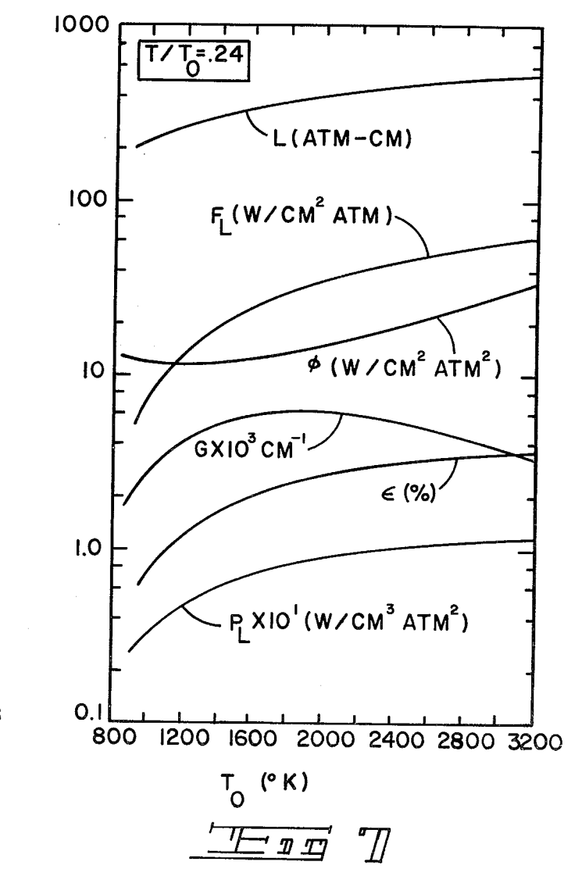
FIG. 7 is a plot of specific parameters as a function of stagnation temperature for a temperature ratio across the nozzle of 0.24 for a gas mixture the same as those for FIG. 4.

Additional computations are shown in FIGS. 7 and 8 in which the stagnation temperature is varied at constant temperature ratio across the nozzle. The Mach number varies only slightly throughout the temperature range. For the temperature ratio ($T/T_o$) of 0.24 used in these computations, the values of quantities which are only slowly varying with temperature are shown in Table III. The gas mixture is the same as that used for FIGS. 4 and 6.

TABLE III

| Stagnation Temp. ($T_o$) | Optimum J | Mach Number $M_F$ | Area Ratio | Stag. Pressure Ratio |
|---|---|---|---|---|
| 3000 | 25 | 4.228 | 16.47 | 10.7 |
| 2800 | 25 | 4.225 | 16.36 | 10.6 |
| 2600 | 23 | 4.222 | 16.23 | 10.6 |
| 2400 | 23 | 4.218 | 16.07 | 10.5 |
| 2200 | 21 | 4.212 | 15.89 | 10.4 |
| 2000 | 21 | 4.206 | 15.67 | 10.2 |
| 1800 | 19 | 4.198 | 15.41 | 10.1 |
| 1600 | 17 | 4.188 | 15.09 | 9.9 |
| 1400 | 17 | 4.175 | 14.69 | 9.6 |
| 1200 | 15 | 4.157 | 14.20 | 9.3 |
| 1000 | 15 | 4.134 | 13.60 | 9.0 |

The optimum J value is the value of upper state rotational quantum number for which the gain is maximum. The Mach number shown is the frozen Mach number as defined previously. The area ratio is the ratio of downstream tunnel area to throat area required to obtain a temperature ratio of 0.24. The stagnation pressure ratio gives the stagnation pressure loss across a normal shock and is important in fixing the minimum stagnation pressure for systems exhausting to atmospheric pressure as discussed earlier.

FIG. 7 shows laser quantities as a function of stagnation temperature $T_o$. The quantities are defined in th same manner as those of FIG. 4 except that the thermal efficiency plotted here is the actual thermal efficiency and not an efficiency ratio as before.

FIG. 8 shows load lines for the gas dynamic laser at several stagnation temperatures for a temperature ratio ($T/T_o$) of 0.24 as in FIG. 7. The end points of the load lines are the saturation laser power density at $G = 0$ and the small signal gain at $P_L = 0$. The load line gives the power production density as a function of gain determined by the gain = loss condition of the resonator. The fraction of this total loss which represents output coupling gives the fraction of the power production density that represents useful output. The intracavity flux at any point on the curves is given by the ratio of the power density to the gain at that point. These curves are important for determining optimum coupling and mirror heating rates for a given device.

The preceding calculations while theoretical indicate a wide operating flexibility for the gas dynamic laser and allow conditions to be tailored to fit the demands of a particular situation.

Figure 9:
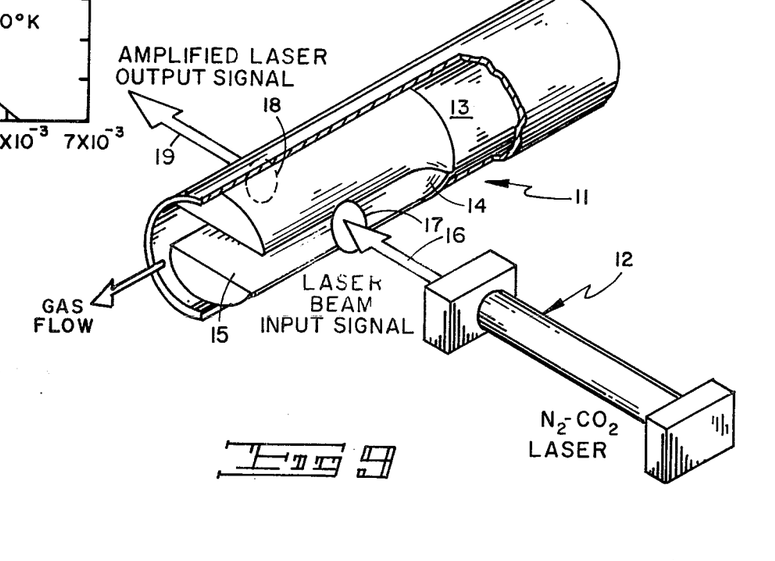
FIG. 9 is a diagrammatical representation with parts broken away of a laser in accordance with the invention.

The description of the present invention will be facilitated by a description of the background invention of the above-mentioned copending patent application entitled "Apparatus for and Method of Providing Population Inversion," Ser. No. 626,356 filed Feb. 16, 1967. The preferred embodiment of that invention is illustrated in FIG. 9 and comprises a power amplifier included in a master oscillator-power amplifier system, designated by the numeral 11 and of utility in communications, radar and the like.

Such an arrangement is particularly useful because mode control, frequency stabilization, modulation and the like may be carried out in the external oscillator or driver 12 where conventional techniques are applicable and the circulating power is low, at least as compared to that attainable in the amplifier 11. Broadly, because of high saturation flux in the amplifier 11 that would be present for high power outputs, a highly folded configuration is recommended in combination with a moderately high input signal from the oscillator or drive 12.

The driver 12 may, for example, comprise a conventional low power electrically excited $N_2/CO_2$ oscillator and an intermediate amplifier (not shown) if necessary to provide the necessary drive for the amplifier 11. Thus, as shown in FIG. 9, a master oscillator-power amplifier arrangement may comprise conventional electrically excited $N_2/CO_2$ laser 12 and a power amplifier. To facilitate discussion, it is assumed that amplifier 11 has the operational parameters and gas as shown and described in accordance with FIG. 3a. Accordingly, the amplifier 11 may comprise a heating region 13 such as a combustion chamber for heating a gaseous mixture of, for example, 89 mole percent $N_2/CO$, 10 mole percent $CO_2$, and 1 mole percent $H_2O$, to a temperature and pressure to provide a substantial portion of the total energy of the gaseous mixture in at least the upper laser level of the polyatomic gas. Such a substantial portion, as is understood in the art, is about 1 – 5% of the total energy in the gaseous mixture. For the above gas a suitable temperature and pressure was found to be respectively 1600° K and about 20 atmospheres. The gaseous mixture is preferably as free from impurities as is practially possible. While not exhaustive, other polyatomic gases in addition to carbon dioxide that may be suitable are nitrogen dioxide, sulphur dioxide, nitrous oxide, water and carbon disulfide. Suitable auxiliary gases in addition to nitrogen that may be suitable are carbon monoxide, oxygen, nitric oxide, water vapor, helium, ammonia and methane. Supersonic nozzle 14 receives the heated gaseous mixture and expands it to supersonic velocities to provide, for example, in the working chamber 15 downstream of the nozzle 14 a velocity of about Mach 4, a temperature of about 400° K and a pressure of about 0.1 atmospheres. A light beam path for the input signal 16 from the driver 12 is defined by transparent windows 17 and 18. Accordingly, when an input signal 16 from driver 12 is supplied to chamber 15 via window 17, this signal emerges from window 18 as an amplified output signal 19. For high power applications, i.e., when optical light flux is in the range of about 1 KW/CW² or more, conventional solid windows may not prove satisfactory and resort to differential pumping techniques or the like may be required as a substitute for the solid windows. Further, a folded configuration may be provided by causing the optical input signal to be introduced into the chamber at a given point, reflected back and forth across the chamber as by appropriately orientated mirrors, and emitted from the chamber at a point remote from the point at which it entered the chamber.

As pointed out earlier, the gas in the amplifier 11 is cooled by expansion to supersonic speeds. This is of particular significance as such as expansion is inherently a volume process which can be performed in any size chamber and at any density consistent with the relevant vibrational relaxation times. Further, since the principle of operation of the invention is based on transitions between vibrational levels in the ground electronic state which are significantly populated at reasonable stagnation temperatures attainable, for example, by combustion, and the differential relaxation leading to inversion in chamber 15 of the amplifier 11 is collision dominated and is therefore a volume process, substantially no fundamental limit on the size (and hence the output power of amplifier 11) exists. By contrast, provision of an inversion as a direct result of chemical reaction as suggested, for example, by Polanyi, results in a nonequilibrium population produced directly in the chemical reaction. The size of a device for providing an inversion between electronic states by differential radiative relaxation as suggested by Hurle and Hertzberg, which incidentally did not perform successfully, is in any event limited because of radiative trapping. Further, the stagnation temperatures required to have a significant fraction of the energy in the desired electronic level at equilibrium in such devices are quite high.

Let the element 13 of FIG. 9 be a combustion chamber, omit the driving element 16, let 14 be a nozzle, and let 15 of FIG. 9 be the exhaust of the chamber for the lasing medium, and couple an optical resonator cavity into the path 16, 19 of FIG. 9, and the evolution of a laser in accordance with the invention will be understood, as will hereinafter appear in the specific description of FIG. 10.

Combustion driven devices in accordance with the invention have been successfully tested and provided laser action. A diagrammatic representation of such a device is shown by way of example in FIG. 10. The above-noted tests were carried out with specific fuels and among other things showed that the combustion products of cyanogen ($C_2N_2$) behave at least substantially identically to pure $N_2$-$CO_2$ mixtures discussed hereinbefore. Laser action has also been obtained using the combustion products of the hydrocarbon, toluene. Other possible fuels are carbon monoxide, carbon, methane, ethane, benzene and the like. However, in the use of toluene, it appeared that the critical $p_0h$ is smaller than that with cyanogen and laser action was only observed at reduced pressures. This is, most likely, the result of large concentrations of water as a constituent of the gas. Although water has a favorable effect in small concentrations (preferably substantially less than about 10 mole percent) as previously pointed out, it has been found that large quantities cause too rapid deactivation of the upper laser level. Thus, as compared to the use of cyanogen, when fuels such as toluene are used, either a lower pressure or a smaller nozzle throat is required to reduce the number of kinetic collisions occurring during the expansion. The prevention of excessive concentrations of water is, of course, also helpful.

Figure 10:
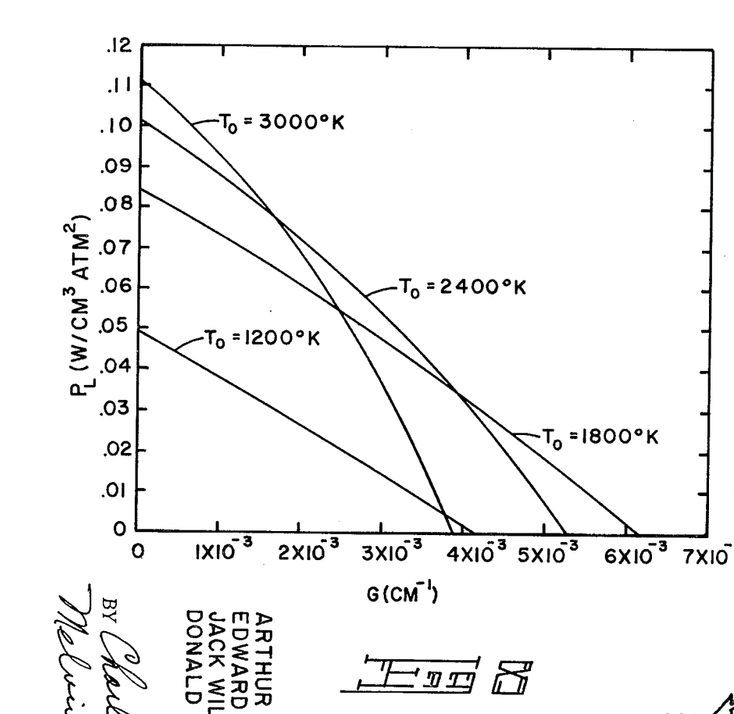
FIG. 10 is a diagrammatical representation in cross section of a laser in accordance with the invention, showing the nozzle in cross section.

Directing attention now to FIG. 10, a laser in accordance with the invention includes a combustion driven device comprising a combustor or burner 31 to which may be supplied a suitable fuel such as cyanogen via pipe 32, and a mixture of oxygen, nitrogen, and hydrogen via pipe 33. The gases are mixed and fuel burned in the combustor 31 to provide therein a gaseous mixture in substantially complete equilibrium comprised of, for example, about 89 mole percent $N_2$/CO, about 10 mole percent $CO_2$, and 1 mole percent $H_2O$ at a stagnation temperature of about 1600° C and a pressure of about 15 atmospheres. The equilibrium gaseous mixture is exhausted from the combustor 31 via supersonic nozzle 34 and supplied to chamber 35 disposed downstream of nozzle 34. The supersonic nozzle 34 accelerates the gaseous mixture to provide in chamber 35 a velocity of about Mach 4, a pressure of about 0.1 atmospheres, and a temperature of about 300°–500° C, whereby there is provided in the chamber 35 the population inversion as previously described. The chamber 35 may be slightly divergent in the direction of flow to provide substantially constant gas velocities, pressure and temperatures. After passing through chamber 35, the gas mixture is supplied to a diffuser 36 and, for an open cycle system, thereafter exhausted to the atmosphere. Conventional means 37 and 38 are also provided for controlling the supply of fuel and/or combustion supporting medium to the combustion chamber whereby the combustion of fuel in the combustion chamber provides the polyatomic gas and auxiliary gas or gases at the required temperature and pressure.

A fully reflective mirror 39 and a partially reflective mirror (not shown in FIG. 10 but see FIG. 11) is substituted for the windows in FIG. 10. The mirrors provide an optical cavity or resonator. Because of inter alia, the high heat flux which is encountered on the mirrors, conventional mirrors such as dielectric coated Irtran and salt mirrors have been found unsatisfactory, whereas copper mirrors with hole coupling have operated satisfactorily. The combustor, nozzle, chamber, diffuser, and mirrors and the like must of course be cooled because of the heat fluxes to which they are of necessity exposed. Conventional cooling techniques may be employed to maintain the various components at safe operating temperatures. In addition to usual heat fluxes encountered in combustion driven aerodynamic devices of this type, the heat flux on the mirrors due to laser action imposes and added heat load on the mirrors. This laser heat flux can be adjusted to a suitably low level by those versed in the art as, for example, by flowing cool nitrogen over the mirrors to bring the temperature of the mirrors to a level comparable to the usual heating encountered in such devices. Accordingly, conventional means of cooling have not been shown for purposes of clarity and a discussion thereof is not deemed necessary.

The mirror metal preferably is as pure as possible and dead soft. In the case of copper, 99.999% purity and annealing to make it dead soft is recommended.

Figure 11:
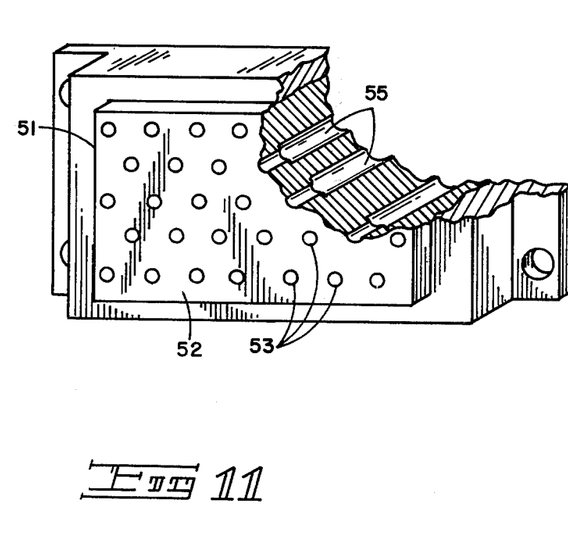
FIG. 11 is a perspective view with parts broken away of a metal mirror with hole coupling.

A copper metal mirror with hole coupling is shown in FIG. 11. The mirror 50 may be formed of 99.999% pure, dead soft copper fixedly carried in a mounting bracket 51. The active surface 52 is optically polished such that the wavelength of the radiation striking it is greater than the wavelength corresponding to the state of the surface. Holes 53 are provided in the active surface 52 and extend through the mirror to provide coupling out of the chamber 35. The total area of the holes is selected to provide the necessary percent of transmission. The holes 53 as shown in FIG. 11 are arranged and adapted to provide an equilateral array. Passages 54 which define holes 53 preferably extend only a short distance into the mirror and communicate with axially aligned passages 55 having a greater diameter. Such an arrangement facilitates formation of the holes 53 and reduces reflections within the mirror itself. The fully reflective mirror, with the exception of the shape of its active surface and the absence of holes, is identical to the partially transmissive mirror. The partially transmissive mirror is preferably substantially optically flat whereas the fully reflective mirror is provided with an active surface shape most conducive to maximum reflection between the mirrors.

As an example, measurements on a copper mirror used successfully in the extraction of 40 watts are given below in Table IV:

TABLE IV

| | Pre Test | Post Test |
|---|---|---|
| Sphericity - 950 mm radius | ± 0.3 waves at $10.6\mu$ | Same |
| Pits - | $5\mu$ dia., .01% of surface | Same plus $1\mu$ pits on 8% of surface at most dense area. Total number $\approx 10^6$ |
| Scratches - | $<2\mu$, moderate | Same |
| Sleeks - | None | None |
| Inclusions - | .01% of surface | Same |
| Grain - | 1 cm diameter | Same |
| Orange peel - | Mild | Same |
| Absorptance - | 0.8% | 0.8% |
| Diffuse reflectance - | 0.7% | 0.7% |
| Specular and small angle reflectance - | 98.5% | 98.5% |

Contaminants, foreign particles such as may result from erosion or otherwise, and the generation of carbon or the like in the gas flowing past the mirrors preferably should be avoided.

Figure 12:
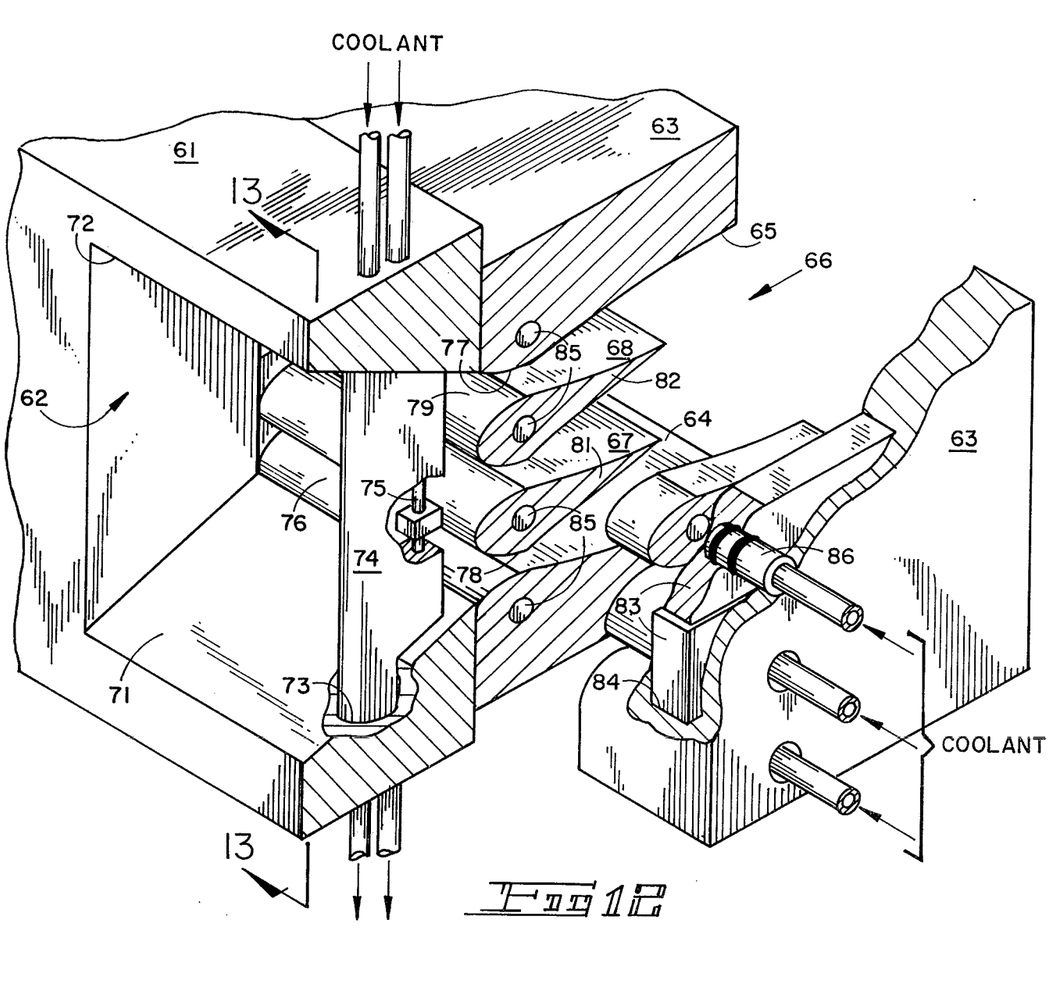
FIG. 12 is a perspective view with parts broken away showing details of a multi-slit throat nozzle.
Figure 13:
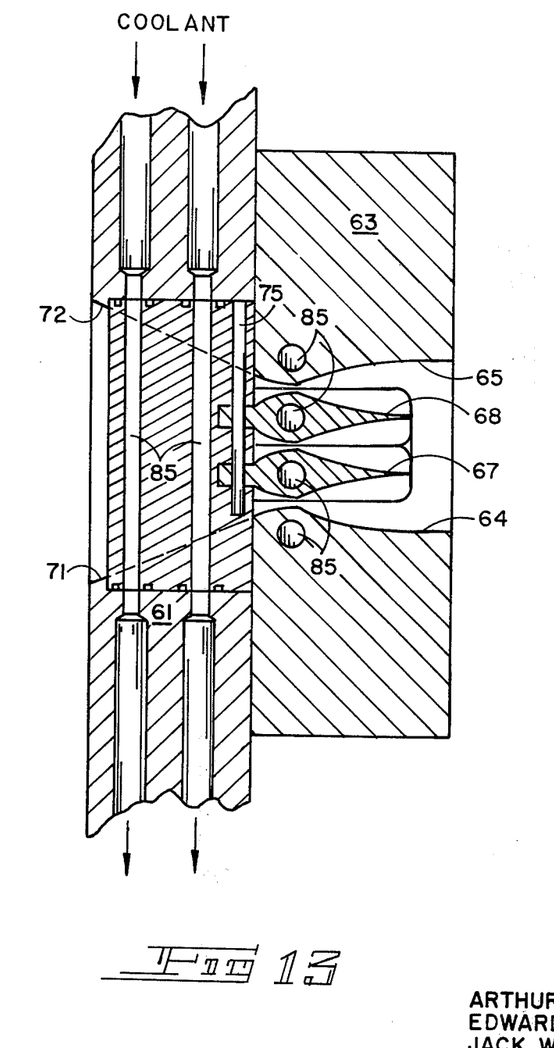
FIG. 13 is a side sectional view taken on line 13—13 of FIG. 12.

Referring now to FIG. 12, there is shown, by way of example, an elongated multi (in this case three) throat nozzle comprising a first main member 61 defining at its center the majority of the upstream end of the inlet portion 62 of the nozzle, a second main member 63 defining in part at its center the downstream end of the inlet portion 62 and the outermost surfaces 64 and 65 of the outlet portion 66 of the nozzle, and two vane members 67 and 68 removably carried by both the first and second members 61 and 63. The vane members 67 and 68 together with the second main member 63, as best shown in FIG. 13, define three elongated slit nozzles, one above the other and each having a configuration such that for the temperatures and pressures in the combustion chamber they each provide a flow time in the nozzle that is short compared to the effective relaxation time of the upper laser level of the gas and long compared to the effective relaxation time of the lower laser level of the gas flowing therethrough. Such a suitable flow time is about Mach 4.

Directing attention now to the first main member 61, it will be seen that it is provided with surfaces 71 and 72 generally convergent in the direction of flow which couple the combustion chamber or heat source (not shown) to the nozzle and direct the heated gas to the various nozzle throats. A plurality of oppositely disposed grooves 73 are provided in the aforementioned surfaces to receive vane member supporting bars 74. The supporting bars may abut the second main member 63, are fixedly attached as by pins 75 to each of the vane members and are adapted for a close fit with the aforementioned grooves 73 to prevent substantially all movement of the vane members and, hence, variation of nozzle position and dimensions.

The upstream end of the second main member 63 is provided with oppositely disposed surfaces 76 and 77 generally convergent in the direction of gas flow. Surfaces 76 and 77 comprise extensions of surfaces 71 and 72 in the first main member 61. Surfaces 76 and 77 in combination with the outermost surfaces 78 and 79 of the upstream end of respectively vane members 67 and 68 define the upstream portion of the outermost nozzle throats. The remaining or inner portion of the upstream end of each vane member of course defines the upstream end of the inner or middle nozzle throat. The portions 81 and 82 of the vane members downstream of the nozzle throats are provided with a profile that in combination with surfaces 64 and 65 of the second main member define the downstream portion 66 of the nozzle as and for the purposes set forth hereinbefore.

The ends of each vane member are provided with end blocks 83 which are removably carried in oppositely disposed grooves 84 in the side portions of the second main member. Movement of the vane members both parallel and normal to the direction of gas flow is not only prevented by the supporting bars 74 but also by the end blocks 83 carried in grooves 84. However, clearance should be provided between the outermost surface of the end blocks and the second main member to permit expansion of the vane members in their length direction.

The various components comprising the nozzle may all be formed of copper for heat transfer purposes but the surfaces thereof exposed to gas flow are preferably provided with a thin smooth coat of a highly reflective or polished metal such as gold, silver, chromium and the like. Passages 85 for receiving a coolant are provided in the first and second main members, supporting bars and vane members to maintain these components at temperatures adequate to maintain their integrity and prevent undue erosion of the surfaces exposed to gas flow.

In mounting the vane members in the second main member, it has been found advantageous to attach to the external coolant pipes piston-type seals 86 each having two O-rings spaced apart and disposed for contact with second member and with the vane members. Thus, each vane member may be disposed in grooves 84 and the piston seals 86 brought into and maintained in engagement with recesses in each vane member through passages in the second main member. This arrangement prevents leakage of coolant which in the case of water is very important, permits expansion of the vane members and facilitates removal or replacement of the vane members.

While there has been shown what is at present considered to be the preferred embodiment of the invention, it will be understood by those skilled in the art that various changes and modifications may be made therein without departing from the proper scope of the invention as defined in the claims.

Having fully disclosed the invention, we claim:

1. A high power laser comprising the combination of a chamber formed with an inlet and an exhaust,
    a nozzle in communication with said chamber,
    means having an outlet in communication with said inlet for heating a polyatomic gas to provide equilibrium vibrational excitation in said gas, said polyatomic gas having an upper laser level and a lower laser level and a ground state, said upper laser level having an effective relaxation time that is long compared to the effective relaxation time of the lower laser level, the heated gas being expanded into said chamber in a stream to provide a flow time in said nozzle that is short compared to the effective relaxation time of said upper laser level and long compared to the effective relaxation time of said lower laser level,
the flow of said gas being through said chamber and out of said exhaust,
and an optically resonant cavity coupled to said stream.

2. The combination in accordance with claim 1 wherein the nozzle is proportioned to expand said polyatomic gas to supersonic velocities in said chamber.

3. In a laser the combination comprising:
means forming a chamber having an inlet opening for receiving and an outlet opening for exhausting a gaseous mixture,
said gaseous mixture comprising a polyatomic gas having an upper laser level, a ground state and a lower laser level intermediate said upper laser level and said ground state,
at least one auxiliary gas, said auxiliary gas having at least one energy level at least substantially resonant with one of said laser levels and a relaxation time different from the relaxation time of said at least one of said laser levels operative to increase, with respect to the ratio that would exist in said polyatomic gas per se, the ratio of the relaxation time of said upper laser level to the relaxation time of said lower laser level;
means for heating said gaseous mixture to a first temperature at a first pressure to provide a substantial portion of the total energy of said gaseous mixture in at least said upper laser level;
nozzle means disposed between said heating means and said chamber for receiving said heated gaseous mixture at said first temperature and pressure from said heating means and expanding and supplying said gaseous mixture to said chamber at supersonic velocities,
said nozzle means providing a flow time in said nozzle that is short compared to the effective relaxation time of said upper laser level and long compared to the effective relaxation time of said lower laser level to provide a second gas temperature and second pressure downstream of said nozzle means that are low compared to respectively the first temperature and pressure of said gaseous mixture in said heating means to provide a population inversion in said chamber; and
optical resonator means defining an optically resonant light beam path through the gaseous mixture in said chamber.

4. The combination as defined in claim 3 wherein said means for heating said gaseous mixture comprises:
burner means including a combustion chamber having an outlet for products of combustion coupled to said nozzle;
means for supplying a fuel and at least a combustion supporting medium to said combustion chamber at a point remote from said outlet; and
means for controlling the supply of said fuel and combustion supporting medium to said combustion chamber whereby the combustion of said fuel in said combustion chamber provides said polyatomic gas and said auxiliary gas at said first temperature and pressure.

5. In a laser the combination comprising:
means forming a chamber having an inlet opening for receiving and an outlet opening for exhausting a gaseous mixture;
first means for supplying to said chamber inlet opening a heated, high velocity gaseous mixture comprising a polyatomic gas having an upper laser level, a ground state and a lower laser level intermediate said upper laser level and said ground state, and at least one auxiliary gas, said auxiliary gas having at least one energy level at least substantially resonant with one of said laser levels and a relaxation time different from the relaxation time of said at least one of said laser levels effective to increase, with resepct to the ratio that would exist in said polyatomic gas per se, the ration of the relaxation time of said upper laser level to the relaxation time of said lower laser level,
said first means including heating means for heating said gaseous mixture to a first temperature at a first pressure to provide a substantial portion of the total energy of said gaseous mixture in said upper laser level and
nozzle means disposed between said heating means and said chamber for receiving said heated gaseous mixture at said first temperature and pressure from said heating means and expanding and supplying said gaseous mixture to said chamber at supersonic velocities,
said nozzle means providing a flow time in said nozzle that is short compared to the effective relaxation time of said upper laser level and long compared to the effective relaxation time of said lower laser level to provide a second gas temperature and second pressure downstream of said nozzle means that are low compared to respectively the first temperature and pressure of said gaseous mixture in said heating means to provide a population inversion in said chamber, and
optical cavity means defining an optically resonant light beam path through the gaseous mixture in said chamber.

6. The combination as defined in claim 5 wherein said auxiliary gas has a vibrational energy level at least substantially resonant with said upper laser level of said polyatomic gas, said energy level having vibrational relaxation time at least greater than the relaxation time of said upper laser level operative to increase the effective relaxation time of said upper laser level.

7. The combination as defined in claim 6 wherein said polyatomic gas is carbon dioxide and said first auxiliary gas is nitrogen, said carbon dioxide and nitrogen comprising said mixture and said mixture comprising about 5 to 10 mole percent carbon dioxide and about 85 to 95 mole percent nitrogen.

8. The combination as defined in claim 7 wherein the mixture includes a second auxiliary gas, said second auxiliary gas having a vibrational energy level at least substantially resonant with said lower laser level of said polyatomic gas, said energy level having a vibrational relaxation time at least less than the relaxation time of said lower laser level operative to decrease the effective relaxation time of said lower laser level without substantially affecting the effective relaxation time of said upper laser level.

9. The combination as defined in claim 7 wherein said polyatomic gas is carbon dioxide, said first auxiliary gas is nitrogen, and said second auxiliary gas is water vapor.

10. The combination as defined in claim 8 wherein said gaseous mixture contains about 5 to 15 mole percent polyatomic gas, about 85 to 95 mole percent first auxiliary gas, and about 0.1 to 2 mole percent second auxiliary gas.

* * * * *